(12) United States Patent
Ohta et al.

(10) Patent No.: US 11,708,881 B2
(45) Date of Patent: Jul. 25, 2023

(54) TENSIONER

(71) Applicant: TSUBAKIMOTO CHAIN CO., Osaka (JP)

(72) Inventors: Haruhisa Ohta, Osaka (JP); Osamu Yoshida, Osaka (JP); Yuichiro Ishikawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 17/501,469

(22) Filed: Oct. 14, 2021

(65) Prior Publication Data

US 2022/0196122 A1 Jun. 23, 2022

(30) Foreign Application Priority Data

Dec. 22, 2020 (JP) ................. 2020-212557

(51) Int. Cl.
*F16H 7/08* (2006.01)

(52) U.S. Cl.
CPC ............. *F16H 7/0848* (2013.01); *F16H 7/08* (2013.01); *F16H 2007/0802* (2013.01); *F16H 2007/0806* (2013.01); *F16H 2007/0812* (2013.01); *F16H 2007/0853* (2013.01); *F16H 2007/0859* (2013.01)

(58) Field of Classification Search
CPC ............... F16H 7/08; F16H 2007/0802; F16H 2007/0806; F16H 2007/0812; F16H 2007/0814; F16H 2007/0846; F16H 7/0848; F16H 2007/0851; F16H 2007/0853; F16H 2007/0859; F16H 2007/0891; F16H 2007/0893; F16H 2007/0895; F16H 2007/0897; F16H 2007/0872; F16H 7/18; F16H 2007/185
See application file for complete search history.

(56) References Cited

U.S. PATENT DOCUMENTS

| 3,710,634 | A | * | 1/1973 | Tamaru | F16H 7/0848 474/111 |
| 4,822,320 | A | * | 4/1989 | Suzuki | F16H 7/0848 474/111 |
| 4,874,352 | A | * | 10/1989 | Suzuki | F16H 7/0848 474/111 |
| 5,006,095 | A | * | 4/1991 | Suzuki | F16H 7/0848 474/111 |

(Continued)

FOREIGN PATENT DOCUMENTS

| JP | H11-344086 A | 12/1999 |
| JP | 2001-214957 A | 8/2001 |

(Continued)

*Primary Examiner* — Michael R Mansen
*Assistant Examiner* — Raveen J Dias
(74) *Attorney, Agent, or Firm* — WHDA, LLP

(57) ABSTRACT

To provide a tensioner capable of preventing slipping between a rack portion and ratchet pawls and securing a large backlash with a simple structure. The tensioner includes a ratchet rotatably mounted on a housing and having a front pawl and a rear pawl spaced apart in a front and rear direction on a side face positioned opposite the rack portion. The ratchet includes an additional pawl formed between the front pawl and the rear pawl in the front and rear direction on the side face positioned opposite the rack portion.

3 Claims, 8 Drawing Sheets

(56) References Cited

U.S. PATENT DOCUMENTS

| | | | | |
|---|---|---|---|---|
| 5,073,150 A * | 12/1991 | Shimaya | F16H 7/0848 | 474/110 |
| 5,184,982 A * | 2/1993 | Shimaya | F16H 7/0848 | 474/111 |
| 6,059,678 A | 5/2000 | Suzuki | | |
| 6,062,999 A * | 5/2000 | Suzuki | F16H 7/0848 | 474/111 |
| 6,234,928 B1 * | 5/2001 | Suzuki | F01L 1/02 | 474/101 |
| 6,612,951 B2 * | 9/2003 | Kurohata | F16H 7/0848 | 474/110 |
| 6,666,785 B1 * | 12/2003 | Namie | F16H 7/0848 | 474/138 |
| 6,953,406 B2 * | 10/2005 | Kurokawa | F16H 7/0848 | 474/110 |
| 7,077,772 B2 * | 7/2006 | Hashimoto | F16H 7/0848 | 474/109 |
| 7,351,170 B2 * | 4/2008 | Namie | F16H 7/0848 | 474/110 |
| 7,458,909 B2 * | 12/2008 | Hashimoto | F16H 7/0848 | 474/110 |
| 2001/0009876 A1 * | 7/2001 | Kurohata | F16H 7/0836 | 474/101 |
| 2001/0011047 A1 | 8/2001 | Suzuki | | |
| 2002/0006840 A1 * | 1/2002 | Kurohata | F16H 7/0836 | 474/110 |
| 2002/0098931 A1 * | 7/2002 | Kurohata | F16H 7/0836 | 474/110 |
| 2003/0134703 A1 * | 7/2003 | Saitoh | F16H 7/0836 | 474/101 |
| 2003/0186765 A1 * | 10/2003 | Konishi | F16H 7/0836 | 474/101 |
| 2004/0266572 A1 * | 12/2004 | Yoshida | F16H 7/0848 | 474/101 |
| 2004/0266573 A1 * | 12/2004 | Yoshida | F01L 1/022 | 474/101 |
| 2005/0090342 A1 * | 4/2005 | Yoshida | F16H 7/0836 | 474/101 |
| 2005/0197223 A1 * | 9/2005 | Namie | F16H 7/0848 | 474/110 |
| 2006/0089221 A1 * | 4/2006 | Hashimoto | F01L 1/02 | 474/101 |
| 2006/0194661 A1 * | 8/2006 | Hayami | F16H 7/0848 | 474/110 |
| 2006/0270501 A1 * | 11/2006 | Maile | F16H 7/0848 | 474/110 |
| 2006/0293133 A1 * | 12/2006 | Simpson | F16H 7/0848 | 474/110 |
| 2007/0072713 A1 * | 3/2007 | Slopsema | F16H 7/0848 | 474/111 |
| 2007/0142144 A1 | 6/2007 | Kurokawa et al. | | |
| 2008/0261737 A1 * | 10/2008 | Yoshida | F16H 7/0848 | 474/110 |
| 2008/0318717 A1 * | 12/2008 | Kurematsu | F16H 7/0848 | 474/110 |
| 2009/0209376 A1 * | 8/2009 | Kurematsu | F16H 7/0848 | 474/110 |
| 2009/0209377 A1 * | 8/2009 | Kurematsu | F16H 7/0836 | 474/110 |
| 2009/0209378 A1 * | 8/2009 | Kurematsu | F16H 7/0836 | 474/110 |
| 2010/0173735 A1 * | 7/2010 | Suchecki | F02B 67/06 | 474/110 |
| 2010/0298077 A1 * | 11/2010 | Hirayama | F16H 7/0848 | 474/110 |
| 2011/0081997 A1 * | 4/2011 | Markely | F16H 7/0848 | 474/110 |
| 2016/0186838 A1 * | 6/2016 | Kurematsu | F16H 7/08 | 474/110 |
| 2017/0138443 A1 * | 5/2017 | Kurematsu | F16H 7/0838 | |

FOREIGN PATENT DOCUMENTS

| | | | | |
|---|---|---|---|---|
| JP | 2007-147018 A | 6/2007 | | |
| WO | WO-2017089663 A1 * | 6/2017 | | F16H 7/0836 |

* cited by examiner

TENSIONER

BACKGROUND OF THE INVENTION

1. Field of the Invention

The present invention relates to a tensioner used for applying correct tension to a drive belt or a drive chain in a timing system or the like of an engine.

2. Description of the Related Art

Tensioners have been commonly used to maintain correct tension of a chain and the like. For example, in a chain guide mechanism that slidably guides a drive chain such as an endless roller chain passing over respective sprockets of a crankshaft and cam shafts inside an engine room, it is known to use a tensioner to bias the tensioner lever so as to keep correct tension.

Ratchet-type tensioners have been known as such, which are configured to include: a housing having a housing bore that is open on a front side; a plunger disposed inside the housing bore such as to be movable in a front and rear direction and having an outer circumferential surface with a rack portion thereon where a plurality of rack teeth are formed along the front and rear direction; a main biasing unit biasing the plunger forward; and a ratchet axially supported on the housing such as to be rotatable, the ratchet being engaged with the rack portion to stop the plunger from moving rearward (see, for example, Japanese Patent Applications Laid-open No. 2001-214957, Japanese Patent Applications Laid-open No. 2007-147018, and Japanese Patent Applications Laid-open No. H11-344086).

SUMMARY OF THE INVENTION

In such conventional tensioners, as illustrated in FIG. 6A, the ratchet 160 has a front pawl 161 on a side face thereof positioned opposite the rack portion 132 formed on the plunger 130, for engaging the rack portion 132 to stop the plunger 130 from moving rearward, and in addition, a rear pawl 162 spaced a predetermined distance from the front pawl 161 on the back side thereof, so as to secure a certain backlash.

When the tension of the drive chain decreases and the plunger 130 moves forward relative to the housing in the state where the front pawl 161 is engaged with the rack portion 132 to stop the plunger 130 from moving rearward, such a backlash tensioner is configured to transition from the state where only the front pawl 161 contacts the rack portion 132 to a state where the front pawl 161 and rear pawl 162 contact (are tangent to) the rack portion 132 as illustrated in FIG. 6A, after which the tensioner transitions from the state illustrated in FIG. 6A to a state where only the rear pawl 162 contacts the rack portion 132. After that, when the plunger 130 moves further forward and the rack tooth 133 that was engaged with the rear pawl 162 rides over the rear pawl 162 forward, the pawls 161 and 162 each engage with new rack teeth 133 (each behind the rack teeth 133 that were engaged with the pawls).

In such a backlash tensioner, an attempt to increase the backlash would result in the front pawl 161 and the rear pawl 162 contacting (tangent to) the rack teeth 133 nearer to the tips of the rack teeth 133 as illustrated in FIG. 6B, consequently raising an issue that, in the transition from the state where only the front pawl 161 contacts the rack portion 132 to the state where the front pawl 161 and rear pawl 162 contact the rack portion 132 as illustrated in FIG. 6B, slipping may occur wherein the rear pawl 162 fails to engage the rack portion 132.

The present invention solves this problem, its object being to provide a tensioner that can prevent slipping between a rack portion and ratchet pawls and secure a large backlash with a simple structure.

The present invention solves the above problem by providing a tensioner including: a housing having a housing bore that is open on a front side; a plunger disposed inside the housing bore such as to be movable in a front and rear direction and having an outer circumferential surface with a rack portion thereon where a plurality of rack teeth are formed along the front and rear direction; a main biasing unit biasing the plunger forward; and a ratchet rotatably attached to the housing and having a front pawl and a rear pawl spaced apart in the front and rear direction on a side face positioned opposite the rack portion, the front pawl being engaged with the rack portion to stop the plunger from moving rearward, the ratchet including an additional pawl formed between the front pawl and the rear pawl in the front and rear direction on the side face positioned opposite the rack portion.

According to one aspect of the present invention, the ratchet is provided with an additional pawl between the front pawl and the rear pawl in the front and rear direction on the side face positioned opposite the rack portion of the plunger. The additional pawl can engage the rack portion during the transition from a state in which the front pawl is engaged with the rack portion to stop the plunger from moving rearward to a state in which the rear pawl makes contact with the rack portion as the plunger moves forward relative to the housing, which prevents slipping between the ratchet pawls and the rack portion, as well as enables the space between the front pawl and the rear pawl to be increased to secure a large backlash.

According to another aspect of the present invention, the additional pawl is prevented from coming too close to the rack portion and being locked in the dip (valley) between the rack teeth when the ratchet rotates, and smooth engagement between each pawl of the ratchet and the rack portion is realized.

DESCRIPTION OF THE PREFERRED EMBODIMENTS

Hereinafter, a tensioner 10 according to one embodiment of the present invention will be described with reference to the drawings.

Figure 1:
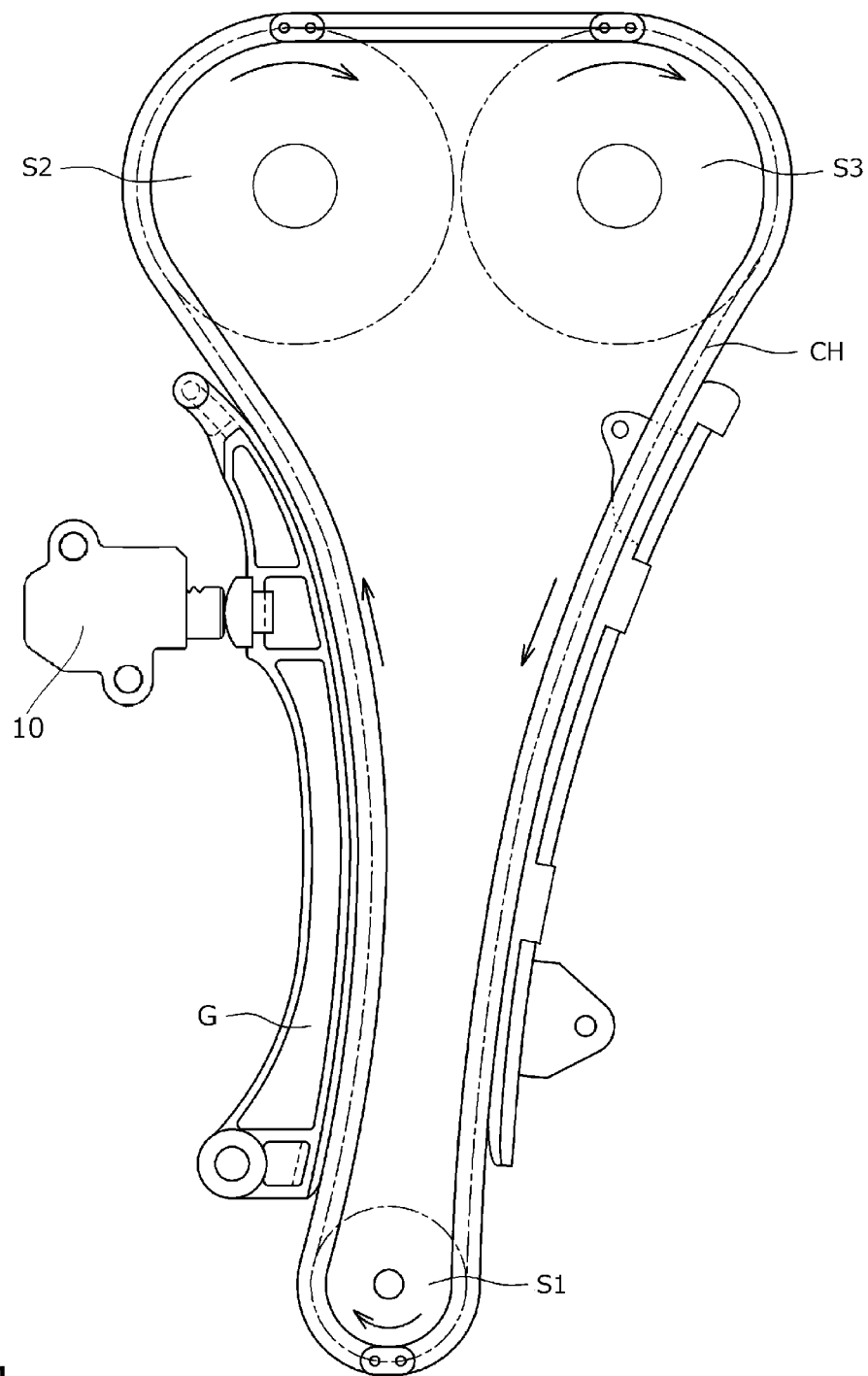
FIG. 1 is an illustrative diagram showing a timing system in which a tensioner according to one embodiment of the present invention is incorporated.

The tensioner 10 is incorporated in a chain drive device used in a timing system or the like of a car engine. As illustrated in FIG. 1, the tensioner is mounted in an engine block (not shown) to apply an appropriate tension to the slack side of a drive chain CH passed over a plurality of sprockets S1 to S3 via a tensioner lever G to reduce vibration during the drive.

Figure 2:
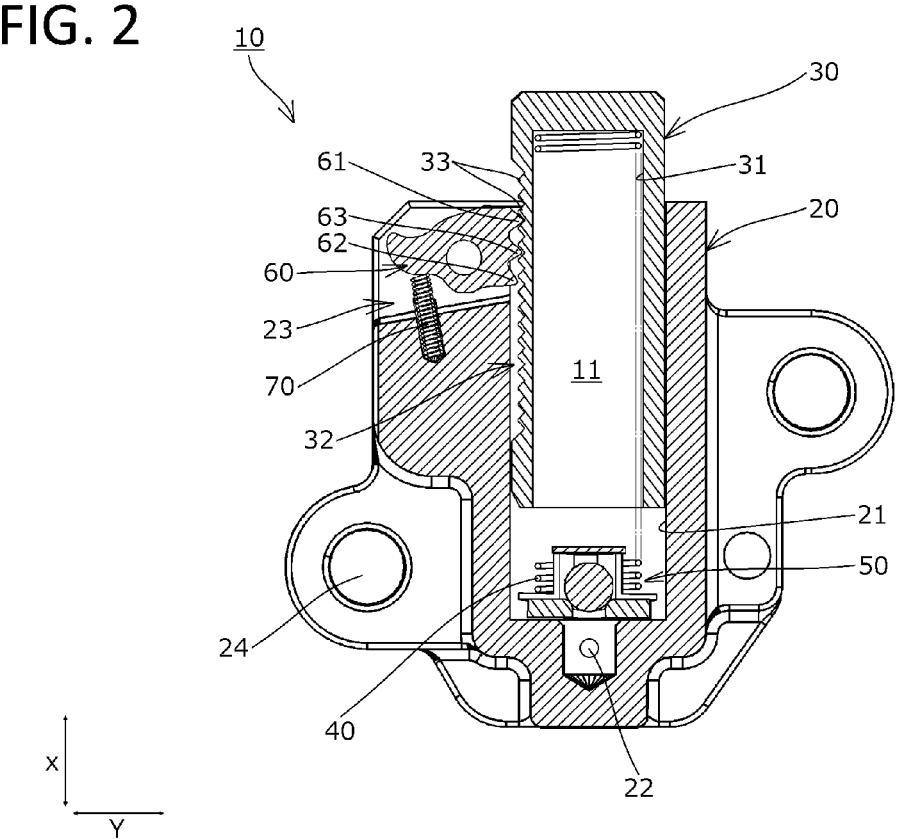
FIG. 2 is a cross-sectional view illustrating the tensioner.

The tensioner 10 includes, as illustrated in FIG. 2, a housing 20 having a housing bore 21 open on a front side, a plunger 30 disposed inside the housing bore 21 such as to be movable (slidable) in a front and rear direction X and having a cylindrical plunger bore 31 that is open on a rear side, an oil pressure chamber 11 formed between the plunger 30 and the housing bore 21, a main spring 40 as a main biasing unit accommodated in the oil pressure chamber 11 such as to freely expand and contract and biasing the plunger 30 forward, a check valve 50 that allows oil to flow from an oil supply hole 22 formed in the housing 20 into the oil pressure chamber 11 and stops the oil from flowing out from the oil pressure chamber 11 into the oil supply hole 22, a ratchet 60 attached to the housing 20 in a rotatable (pivotable) manner, and a ratchet spring 70 as a ratchet biasing unit that biases the ratchet 60.

The constituent elements of the tensioner 10 will each be described below with reference to the drawings.

First, the housing 20 is made of metal such as an aluminum alloy and the like, and includes, as illustrated in FIG. 2, a ratchet receiving groove 23 in which the ratchet 60 is placed, and a mounting hole 24 for a bolt or the like to pass through to fixedly attach the housing 20 to a mounting target such as an engine block (not shown).

The plunger 30 made of metal such as iron is formed in a cylindrical shape with a bottom on the front side, and inserted in the housing bore 21 such as to be movable back and forth in the front and rear direction X, as illustrated in FIG. 2.

Figure 3:
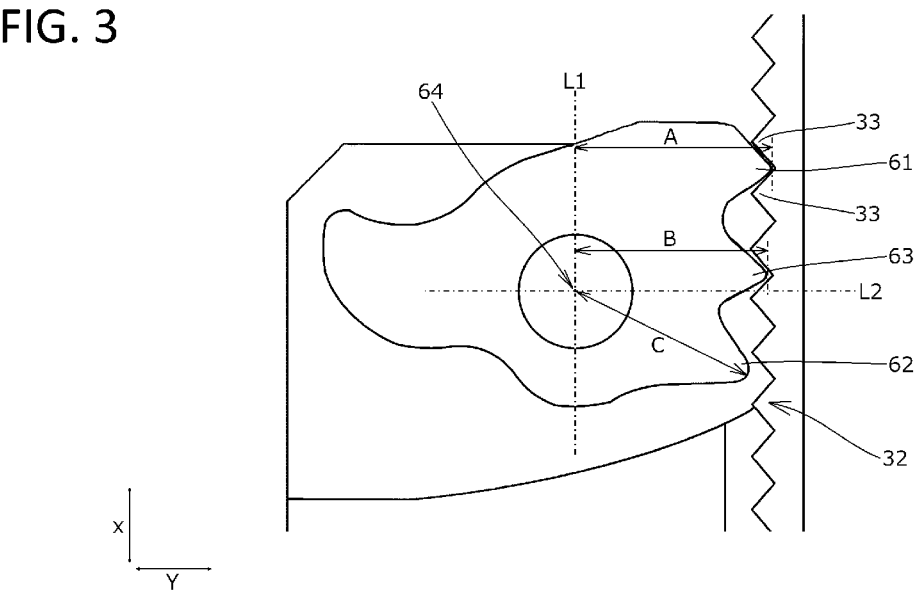
FIG. 3 is an illustrative diagram showing mainly a ratchet mechanism.

A saw teeth-like rack portion 32, having a plurality of rack teeth 33 of the same shape (substantially triangular) aligned at equal pitch along the front and rear direction X, is incised on an outer circumferential surface of the plunger 30 as illustrated in FIG. 2 and FIG. 3.

The rack portion 32 has a length in the front and rear direction X set in accordance with an expected amount of slackness in the drive chain CH.

The main spring 40 is formed in a coil spring shape, with one end sitting on the (rear surface of the bottom on the front side of the) plunger 30 and the other end sitting on the check valve 50 as illustrated in FIG. 2.

Thus, the main spring 40 biases the plunger 30 forward, as well as presses the check valve 50 against the bottom on the rear side of the housing bore 21 of the housing 20 as illustrated in FIG. 2.

The ratchet 60 is made of metal such as iron and attached to the housing 20 such as to be rotatable (pivotable) as illustrated in FIG. 2. In this embodiment, the ratchet is fixed to a ratchet pin (not shown) that is rotatably supported on the housing 20.

The ratchet 60 includes, as illustrated in FIG. 2, a front pawl 61 and a rear pawl 62 spaced apart in the front and rear direction X, and one additional pawl 63 between the front pawl 61 and the rear pawl 62 in the front and rear direction X, on a side face positioned opposite the rack portion 32 of the plunger 30.

The front pawl 61, rear pawl 62, and additional pawl 63 are formed in a substantially triangular shape corresponding to the tooth profile of the rack teeth 33.

Next, detailed configurations of various parts of the ratchet 60 will be described below with respect to an example shown in FIG. 3 and an example shown in FIG. 4.

Figure 4:
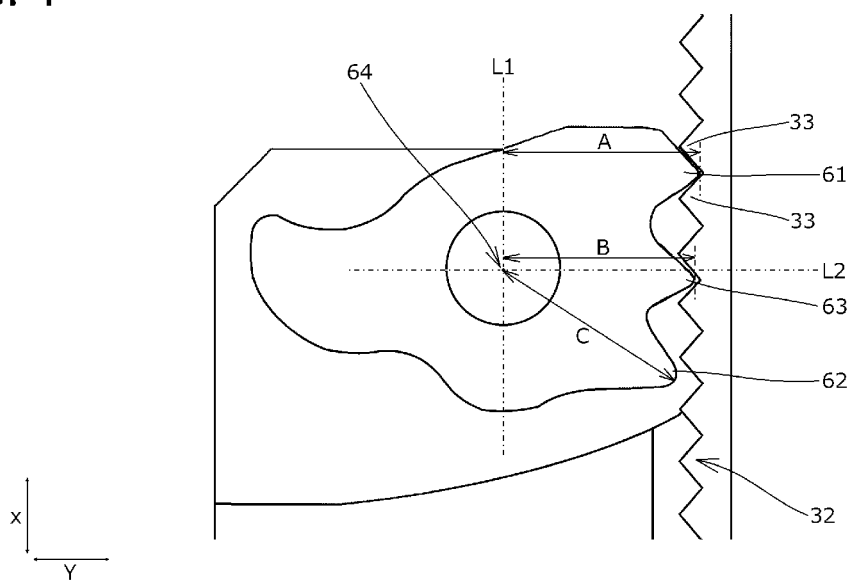
FIG. 4 is an illustrative diagram showing a variation example of the ratchet mechanism.

In the following description, as shown in FIG. 3 and FIG. 4, an imaginary line passing through the rotation center 64 of the ratchet 60 and extending along the front and rear direction X is defined as first imaginary line L1, and an imaginary line passing through the rotation center 64 of the ratchet 60 and extending along a lateral direction Y perpendicular to the front and rear direction X is defined as second imaginary line L2.

Further, in the following description, as shown in FIG. 3 and FIG. 4, A, B, and C respectively define the distance between the rotation center 64 of the ratchet 60 to the tip of the front pawl 61 in the lateral direction Y, the distance between the rotation center 64 of the ratchet 60 to the tip of the additional pawl 63 in the lateral direction Y, and the distance between the rotation center 64 of the ratchet 60 to the tip of the rear pawl 62 in a radial direction with the center being the center 64 of the ratchet 60, when the front pawl 61 is engaged with the rack portion 32 to stop the plunger 30 from moving rearward.

In the example shown in FIG. 3, the ratchet 60 is formed such that, with the front pawl 61 being engaged with the rack portion 32 to stop the plunger 30 from moving rearward, the tip of the additional pawl 63 is positioned more forward in the front and rear direction X than the rotation center 64 of the ratchet 60 (in other words, on the front side of the second imaginary line L2).

In the example shown in FIG. 3, the ratchet 60 is formed such that, with the front pawl 61 being engaged with the rack portion 32 to stop the plunger 30 from moving rearward, the tip of the front pawl 61 is positioned more forward in the front and rear direction X than the rotation center 64 of the ratchet 60 (in other words, on the front side of the second imaginary line L2), and the tip of the rear pawl 62 is positioned more rearward in the front and rear direction X than the rotation center 64 of the ratchet 60 (in other words, on the back side of the second imaginary line L2).

In the configuration of the example shown in FIG. 3 described above, the distances A to C satisfy a relationship of $A \geq B > C$.

In the example shown in FIG. 4, the ratchet 60 is formed such that, with the front pawl 61 being engaged with the rack portion 32 to stop the plunger 30 from moving rearward, the tip of the additional pawl 63 is positioned more rearward in the front and rear direction X than the rotation center 64 of the ratchet 60 (in other words, on the back side of the second imaginary line L2), or in line with the rotation center 64 of the ratchet 60 in the front and rear direction X (in other words, positioned in line with the second imaginary line L2).

In the example shown in FIG. 4, the ratchet 60 is formed such that, with the front pawl 61 being engaged with the rack portion 32 to stop the plunger 30 from moving rearward, the tip of the front pawl 61 is positioned more forward in the front and rear direction X than the rotation center 64 of the ratchet 60 (in other words, on the front side of the second imaginary line L2), and the tip of the rear pawl 62 is positioned more rearward in the front and rear direction X than the rotation center 64 of the ratchet 60 (in other words, on the back side of the second imaginary line L2).

In the configuration of the example shown in FIG. 4 described above, the distances A to C satisfy a relationship of $A > C \geq B$.

The ratchet spring 70 is formed in a coil spring shape, and has one end sitting on the housing 20 and the other end sitting on the ratchet 60 as illustrated in FIG. 2 to bias the ratchet 60 to cause the ratchet 60 to rotate in the direction in which the front pawl 61 moves rearward (direction in which the front pawl 61 engages the rack portion 32).

Next, the movements of the ratchet 60 and others of the tensioner 10 in this embodiment will be described below with reference to FIG. 5A to FIG. 5C. The following description of the movements of the ratchet 60 and others will be made with reference to the example shown in FIG. 3. It should be understood that the ratchet 60 and others operate similarly in the example shown in FIG. 4.

Figure 5A:
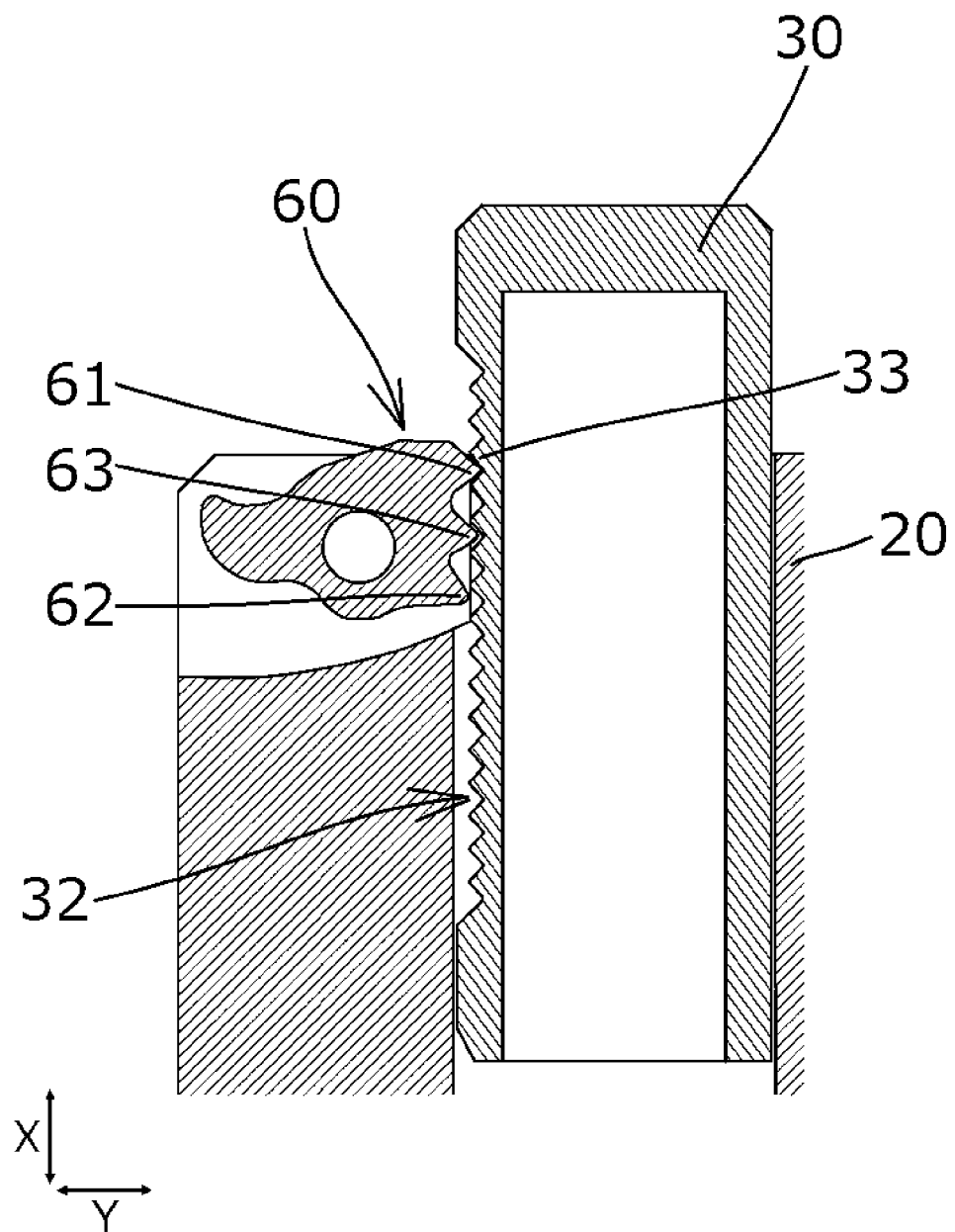
FIG. 5A is an illustrative diagram showing a movement of the ratchet mechanism.

In the tensioner 10, as shown in FIG. 5A, the ratchet spring 70 biases the ratchet 60 to cause the front pawl 61 to engage the rack portion 32 formed on the outer circumferential surface of the plunger 30, so that the plunger 30 is stopped from moving.

In making this engagement, as shown in FIG. 5A, the front pawl 61 substantially snugly fits between the rack teeth 33 of the rack portion 32, while the additional pawl 63 is not in contact with the rack portion 32 (with a slight gap between the additional pawl and the rack portion 32), and the rear pawl 62 is not in contact with the rack portion 32, either.

The ratchet 60 may be formed such that, with the front pawl 61 engaging the rack portion 32 to stop the plunger 30 from moving rearward, the additional pawl 63 also makes contact with the rack portion 32.

The ratchet 60 moves in the following manner when rotated by the plunger 30 moving forward relative to the housing 20 due to a decrease in tension of the drive chain CH, transitioning from the state in which the front pawl 61 engages the rack portion 32 to stop the plunger 30 from moving rearward as illustrated in FIG. 5A to a state in which the rear pawl 62 makes contact with the rack portion 32.

First, when the plunger 30 moves forward in the state shown in FIG. 5A, the front pawl 61 (back side of it) is pushed forward by the rack portion 32 (rack tooth 33), so that the ratchet 60 rotates.

Figure 5B:
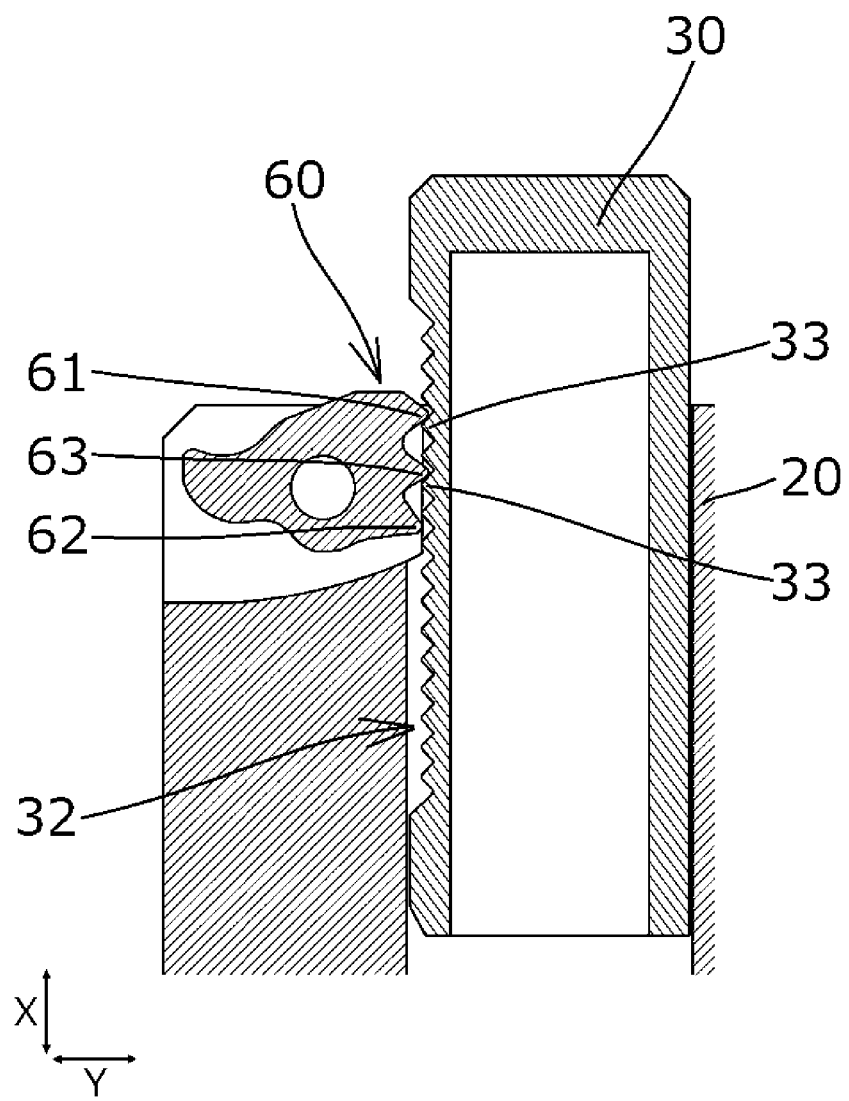
FIG. 5B is an illustrative diagram showing a movement of the ratchet mechanism.

As the plunger 30 moves further forward from there, the ratchet 60 rotates, bringing the additional pawl 63 (back side of it) also in contact with the rack portion 32 as with the front pawl 61 (back side of it) as illustrated in FIG. 5B.

After that, as the plunger 30 moves further forward, the ratchet 60 rotates, so that the front pawl 61 (back side of it) separates from the rack portion 32, leaving only the additional pawl 63 (back side of it) making contact with the rack portion 32.

Figure 5C:
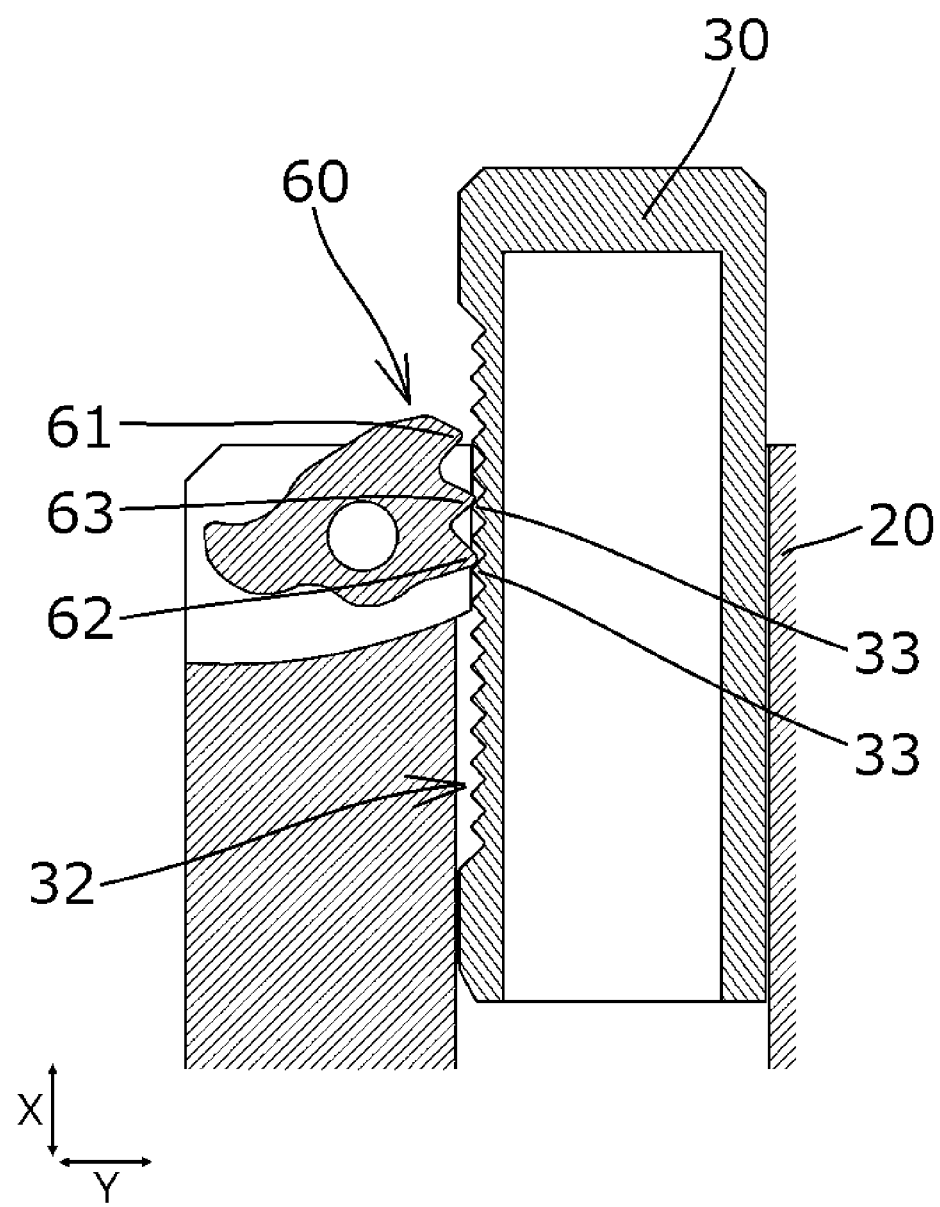
FIG. 5C is an illustrative diagram showing a movement of the ratchet mechanism.
Figure 6A:
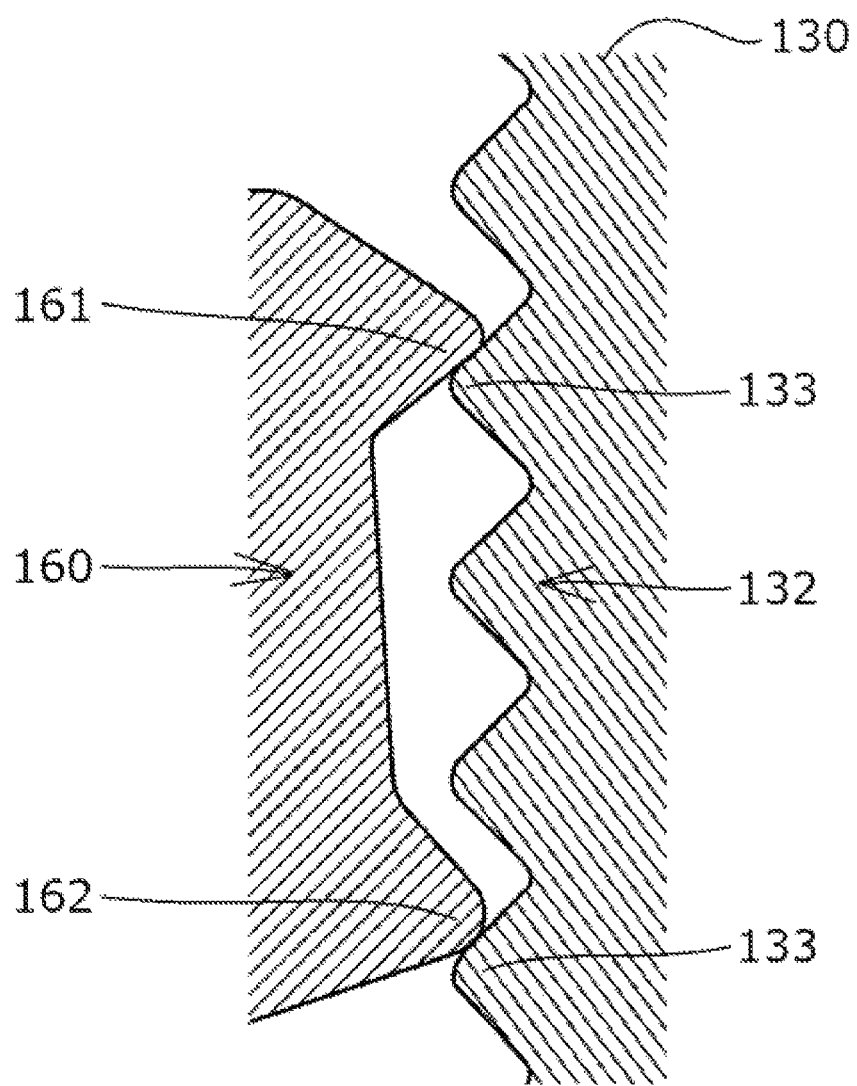
FIG. 6A is a reference diagram for explaining an issue in the existing technique.
Figure 6B:
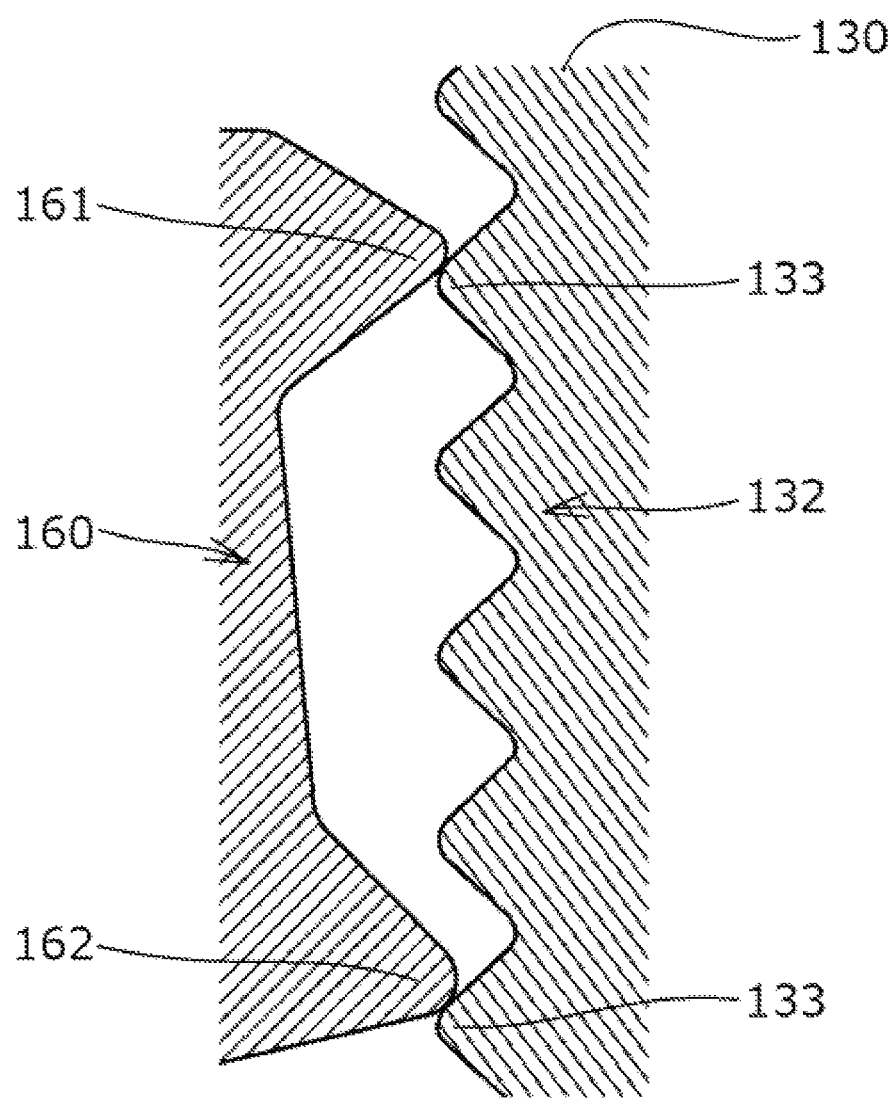
FIG. 6B is a reference diagram for explaining an issue in the existing technique.

As the plunger 30 moves further forward from there, the ratchet 60 rotates, bringing the rear pawl 62 (back side of it) also in contact with the rack portion 32 in addition to the additional pawl 63 (back side of it) as illustrated in FIG. 5C.

After that, as the plunger 30 moves further forward, the ratchet 60 rotates, so that the additional pawl 63 (back side of it) separates from the rack portion 32, leaving only the rear pawl 62 (back side of it) making contact with the rack portion 32.

After that, when the plunger 30 moves further forward and the ratchet 60 rotates, causing the rack tooth 33 that was engaged with the rear pawl 62 to ride over the rear pawl 62 forward, the pawls 61 to 63 each engage with new rack teeth 33 (each behind the rack teeth 33 that were engaged with the pawls). As a result, the tensioner lever G is pushed by the plunger 30 to pivot such as to follow the stretch of the drive chain CH.

In the above description of the transition from the state with only the front pawl 61 contacting the rack portion 32 to the state with only the additional pawl 63 contacting the rack portion 32, there is a state where both of the front pawl 61 and additional pawl 63 contact the rack portion 32 as illustrated in FIG. 5B. Such a state where both the front pawl 61 and the additional pawl 63 contact the rack portion 32 may be eliminated, i.e., the ratchet 60 may be designed such that it transitions from the state with only the front pawl 61 contacting the rack portion 32 directly to the state with only the additional pawl 63 contacting the rack portion 32.

Similarly, in the above description of the transition from the state with only the additional pawl 63 contacting the rack portion 32 to the state with only the rear pawl 62 contacting the rack portion 32, there is a state where both of the additional pawl 63 and rear pawl 62 contact the rack portion 32 as illustrated in FIG. 5C. Such a state where both the additional pawl 63 and the rear pawl 62 contact the rack portion 32 may be eliminated, i.e., the ratchet 60 may be designed such that it transitions from the state with only the additional pawl 63 contacting the rack portion 32 directly to the state with only the rear pawl 62 contacting the rack portion 32.

While one embodiment of the present invention has been described in detail, the present invention is not limited to the above-described embodiment and may be carried out with various design changes without departing from the scope of the present invention set forth in the claims.

For example, while the tensioner was described as a component to be incorporated in a timing system of a car engine in the embodiment above, the purpose of use of the tensioner is not limited to this specific application.

While the tensioner was described as a component that applies tension to a drive chain via a tensioner lever in the embodiment above, the plunger can directly guide the drive chain slidably with a tip thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

Instead of forming one additional pawl between the front pawl and the rear pawl as in the embodiment described above, two or more additional pawls may be formed along the front and rear direction between the front pawl and the rear pawl.

What is claimed is:

1. A tensioner comprising: a housing having a housing bore that is open on a front side; a plunger disposed inside the housing bore such as to be movable in a front and rear direction and having an outer circumferential surface with a rack portion thereon where a plurality of rack teeth are formed along the front and rear direction; a main biasing unit biasing the plunger forward; and a ratchet rotatably attached to the housing and having a front pawl and a rear pawl spaced apart in the front and rear direction on a side face positioned opposite the rack portion, the front pawl being engaged with the rack portion to stop the plunger from moving rearward, the ratchet including an additional pawl formed between the front pawl and the rear pawl in the front and rear direction on the side face positioned opposite the rack portion, wherein the ratchet is formed such that, when the ratchet is rotated by the plunger moving forward relative to the housing and transitions from a state where the front pawl is engaged with the rack portion to stop the plunger from moving rearward to a state where the rear pawl makes contact with the rack portion, the ratchet transitions from a state where only the front pawl contacts the rack portion to a state where the front pawl and the additional pawl contact the rack portion, after which the ratchet transitions from a state where only the additional pawl contacts the rack portion to a state where the additional pawl and the rear pawl contact the rack portion, after which the ratchet transitions to a state where only the rear pawl contacts the rack portion.

2. The tensioner according to claim 1, wherein the ratchet is formed such that the additional pawl has a tip positioned more forward in the front and rear direction than a rotation center of the ratchet in a state where the front pawl is engaged with the rack portion to stop the plunger from moving rearward, and such that A, B, and C satisfy a relationship of $A \geq B > C$, where A, B, and C respectively define a distance between the rotation center of the ratchet to a tip of the front pawl in a lateral direction perpendicular to the front and rear direction, a distance between the rotation center of the ratchet to the tip of the additional pawl in the lateral direction, and a distance between the rotation center of the ratchet to a tip of the rear pawl in a radial direction with a center being the rotation center of the ratchet, when the front pawl is engaged with the rack portion to stop the plunger from moving rearward.

3. The tensioner according to claim 1, wherein the ratchet is formed such that the additional pawl has a tip positioned more rearward in the front and rear direction than a rotation center of the ratchet or in line with the rotation center of the ratchet in the front and rear direction in a state where the front pawl is engaged with the rack portion to stop the plunger from moving rearward, and such that A, B, and C satisfy a relationship of $A > C \geq B$, where A, B, and C respectively define a distance between the rotation center of the ratchet to a tip of the front pawl in a lateral direction perpendicular to the front and rear direction, a distance between the rotation center of the ratchet to the tip of the additional pawl in the lateral direction, and a distance between the rotation center of the ratchet to a tip of the rear pawl in a radial direction with a center being the rotation center of the ratchet, when the front pawl is engaged with the rack portion to stop the plunger from moving rearward.

* * * * *